(12) United States Patent
Feng

(10) Patent No.: US 9,372,968 B2
(45) Date of Patent: Jun. 21, 2016

(54) METHODS AND APPARATUSES FOR EMBEDDING DIGITAL WATERMARK INTO AND EXTRACTING DIGITAL WATERMARK FROM TEXT

(71) Applicants: PEKING UNIVERSITY FOUNDER GROUP CO., LTD., Beijing (CN); FOUNDER INFORMATION INDUSTRY GROUP, Beijing (CN); BEIJING FOUNDER ELECTRONICS CO., LTD., Beijing (CN)

(72) Inventor: Hui Feng, Beijing (CN)

(73) Assignees: PERKING UNIVERSITY FOUNDER GROUP CO., LTD., Beijing (CN); FOUNDER INFORMATION INDUSTRY GROUP, Beijing (CN); BEIJING FOUNDER ELECTRONICS CO., LTD., Beijing (CN)

( * ) Notice: Subject to any disclaimer, the term of this patent is extended or adjusted under 35 U.S.C. 154(b) by 149 days.

(21) Appl. No.: 14/077,613

(22) Filed: Nov. 12, 2013

(65) Prior Publication Data
US 2015/0036871 A1     Feb. 5, 2015

(30) Foreign Application Priority Data
Jul. 31, 2013   (CN) .......................... 2013 1 0329113

(51) Int. Cl.
*G06K 9/00* (2006.01)
*G06F 21/16* (2013.01)

(52) U.S. Cl.
CPC ...................................... *G06F 21/16* (2013.01)

(58) Field of Classification Search
CPC ................... G06T 1/0021; G06T 2201/0051; G06T 2201/0052; G06T 2201/0065; H04N 1/32144; H04N 2201/3233; H04N 19/467; H04N 1/00005; H04N 1/00037; H04N 1/32288; H04N 21/8358; H04N 2201/3205; H04N 2201/3226; G06K 9/00
See application file for complete search history.

(56) References Cited

U.S. PATENT DOCUMENTS

| | | | | |
|---|---|---|---|---|
| 8,332,646 | B1* | 12/2012 | Staley | H04N 5/913 380/201 |
| 2004/0022411 | A1* | 2/2004 | Tamaru | G06T 1/005 382/100 |
| 2004/0220935 | A1* | 11/2004 | McGraw | G09B 19/00 |
| 2004/0258274 | A1* | 12/2004 | Brundage | G07D 7/128 382/100 |
| 2007/0043693 | A1* | 2/2007 | Krieg | 707/1 |
| 2008/0205699 | A1* | 8/2008 | Kuraki et al. | 382/100 |
| 2008/0297853 | A1* | 12/2008 | Yang et al. | 358/3.28 |

* cited by examiner

*Primary Examiner* — Amara Abdi
(74) *Attorney, Agent, or Firm* — Hamre, Schumann, Mueller & Larson, P.C.

(57) ABSTRACT

Methods and apparatus for embedding digital watermark information into and extracting digital watermark information from a text are disclosed. The method for embedding digital watermark information into a text comprises: creating a menu item of the digital watermark information; and embedding a binary string into a value of a predetermined attribute for the menu item of the digital watermark information, the binary string to be embedded being the digital watermark information to be embedded. According to the present invention, it is able to increase the amount of information to be embedded.

22 Claims, 7 Drawing Sheets

---

Creating a menu item of the digital watermark information — 101

Embedding a binary string into a value of a predetermined attribute for the menu item of the digital watermark information — 102

METHODS AND APPARATUSES FOR EMBEDDING DIGITAL WATERMARK INTO AND EXTRACTING DIGITAL WATERMARK FROM TEXT

CROSS-REFERENCE TO RELATED APPLICATIONS

The present application claims priority to Chinese Patent Application No. 201310329113.1 filed before the Chinese Patent Office on Jul. 31, 2013 and entitled "METHODS AND APPARATUSES FOR EMBEDDING DIGITAL WATERMARK INTO AND EXTRACTING DIGITAL WATERMARK FROM TEXT", which is incorporated herein by reference in its entirety.

TECHNICAL FIELD

The present invention relates to the field of information hiding and tracking technologies, in particular to methods and apparatuses for embedding digital watermark information into and extracting digital watermark information from a text.

BACKGROUND

Information hiding technology can hide one piece of information into another piece of carrier information without a user's awareness, and such a technology plays a very important role in many aspects of an information security system. A text digital watermark technology, as a branch of the information hiding technology, uses a text as a carrier and embeds digital watermark information by finding a redundancy space of text information.

Usually, the digital watermark information is embedded into the text based on document format characteristics in the prior art. Such a method uses typesetting characteristics of a text format itself and visual redundancy characteristics of human beings, and embeds a watermark through fine-tuning of the text format. For example, one-bit watermark information may be encoded and embedded into a row by slightly changing the line spacing. It can therefore be seen that, when the length of the text is limited, merely a small amount of information may be embedded into the text if an existing digital watermark embedding method is used.

SUMMARY

An object of the present invention is to provide methods and apparatuses for embedding digital watermark information into and extracting digital watermark information from a text, so as to solve the problem in the prior art that merely a small amount of digital watermark information can be embedded into the text.

In one aspect of the present invention, a method for embedding digital watermark information into a text is provided, the method comprises:

creating a menu item of the digital watermark information; and embedding a binary string into a value of a predetermined attribute for the menu item of the digital watermark information, the binary string to be embedded being the digital watermark information to be embedded.

In another aspect of the present invention, a method for extracting digital watermark information from a text is provided, the method comprises:

determining a menu item of the digital watermark information; and extracting a binary string from a value of a predetermined attribute for the menu item of the digital watermark information, the binary string to be extracted being the digital watermark information to be extracted.

In yet another aspect of the present invention, an apparatus for embedding digital watermark information into a text is provided, the apparatus comprises:

a creation unit configured to create a menu item of the digital watermark information; and a first embedment unit configured to embed a binary string into a value of a predetermined attribute for the menu item of the digital watermark information, the binary string to be embedded being the digital watermark information to be embedded.

In yet another aspect of the present invention, an apparatus for extracting digital watermark information from a text is provided, the apparatus comprises:

a first determination unit configured to determine a menu item of the digital watermark information; and a first extraction unit configured to extract a binary string from a value of a predetermined attribute for the menu item of the digital watermark information, the binary string to be extracted being the digital watermark information to be extracted.

According to embodiments of the present invention, the digital watermark information is carried in the value of the predetermined attribute for the created menu item of the digital watermark information. Because the value of the attribute for the menu item in the text can include a large amount of information, it is able to increase the amount of the information to be embedded.

BRIEF DESCRIPTION OF THE DRAWINGS

The drawings, for further understanding the present invention and constituting a part of the specification, is used to illustrate, but not limit, the present invention in conjunction with the embodiments, in which.

DETAILED DESCRIPTION

In order to increase the amount of digital watermark information to be embedded, embodiments of the present invention provides methods and apparatuses for embedding digital watermark information into and extracting digital watermark information from a text. The present invention is described hereinafter in conjunction with the drawings and the embodiments. It should be appreciated that, the preferred embodiments hereinafter are merely for illustrative purposes but shall not be construed as limiting the present invention. In addition, if without conflict, the embodiments and the features therein can be combined with each other.

Figure 1:
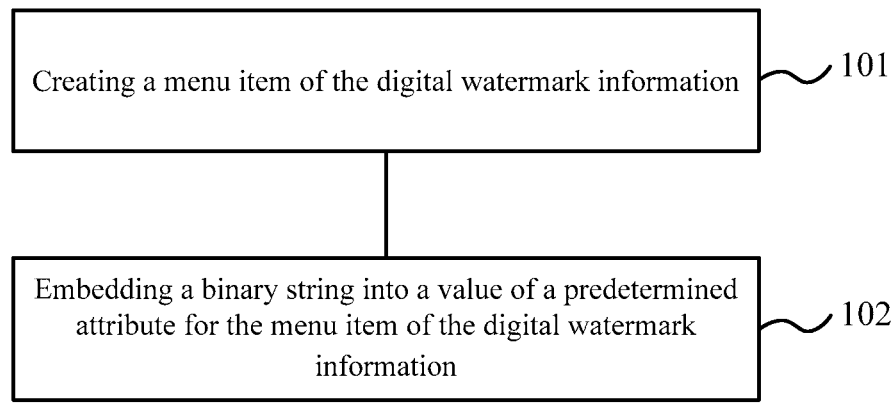
FIG. 1 is a flow chart of a method for embedding digital watermark information into a text according to one embodiment of the present invention.

Referring to FIG. 1, one embodiment of the present invention provides a method for embedding digital watermark information into a text, comprising:

Step 101: creating a menu item of the digital watermark information; and

Step 102: embedding a binary string into a value of a predetermined attribute for the menu item of the digital watermark information, the binary string to be embedded being the digital watermark information to be embedded.

When selecting the predetermined attribute, an attribute whose type is a string shall be selected, and a maximum length of the attribute value of the attribute is greater than a predetermined length. The predetermined length may be set according to the practical needs.

Preferably, an attribute with an assignable length as great as possible may be selected as the predetermined attribute. The greater the maximum length of the value of the predetermined attribute, the more the information to be embedded into the menu item of the digital watermark information.

In Step 102, if the length of the binary string to be embedded is not greater than the maximum length of the values of the predetermined attributes for the menu item of the digital watermark information, a value of the predetermined attribute for the menu item of the digital watermark information may be set as the binary string to be embedded. If the length of the binary string to be embedded is greater than the maximum length of the value of the predetermined attribute for the menu item of the digital watermark information, it is required to divide the binary string to be embedded into several sub-strings, each of which has a length not greater than the maximum length of the value of the predetermined attribute for the menu item of the digital watermark information, and then set the values of the predetermined attributes for the menu item of the digital watermark information as the sub-strings respectively.

In the above-mentioned steps, the digital watermark information is embedded via the menu item of the text. Preferably, the method further comprises embedding the digital watermark information via a redundancy of text content. To be specific, the method comprises:

selecting an information carrier character from the text content, and embedding the binary string into a specified bit of a value of a predetermined attribute for the information carrier character, wherein the predetermined attribute for the information carrier character includes color of the character, underline color of the character and border color of the character.

Figure 2:
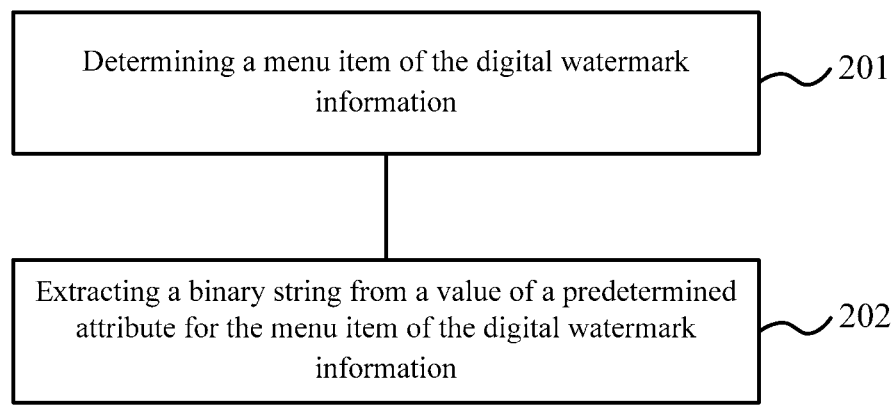
FIG. 2 is a flow chart of a method for extracting digital watermark information from a text according to one embodiment of the present invention.

Correspondingly, embodiments of the present invention further provides a method for extracting digital watermark information from a text, so as to extract the digital watermark information embedded according to the above-mentioned method. Referring to FIG. 2, the extracting method comprises:

Step 201: determining a menu item of the digital watermark information; and

Step 202: extracting a binary string from a value of a predetermined attribute for the menu item of the digital watermark information, the binary string to be extracted being the digital watermark information to be extracted.

With respect to different situations when the digital watermark information is embedded, Step 202 specifically includes acquiring a value of a predetermined attribute for the menu item of the digital watermark information, and determining the binary string to be extracted as the acquired value; or acquiring values of predetermined attributes for the menu item of the digital watermark information, and determining the binary string to be extracted as the acquired binary string consisting of the acquired values.

In the above-mentioned steps, the digital watermark information is extracted from the menu item of the text. When the digital watermark information is further embedded via a content redundancy of the text, the method further comprises extracting the digital watermark information from the text content. To be specific, the method comprises:

determining an information carrier character in the text content, and extracting the binary string from a specified bit of a value of a predetermined attribute for the information carrier character, wherein the predetermined attribute for the information carrier character includes color of the character, underline color of the character and border color of the character.

In addition, after extracting the digital watermark information from both the menu item of the text and the text content, the method further comprises comparing the digital watermark information extracted from the menu item of the text with that extracted from the text content so as to determine the validity thereof.

The methods for embedding the digital watermark information into and extracting the digital watermark information from the text are described hereinafter in conjunction with the drawings and the embodiments.

First Embodiment

Many text processing tools support to programmatically customize menu items and can hide the menu items. The custom menu items may be attached to an independent document. Each menu item includes several attributes and types of values of the attributes are binary strings. For example, in Word, each menu item includes several submenu items, each of which includes the attributes such as Caption, DescriptionText, HelpFile, Parameter, and Tag. The values of these attributes may be assigned binary strings with a maximum length of 255 bits. Hence, the digital watermark information may be embedded by increasing the menu items of the digital watermark information. Detailed description is provided hereinafter by taking the embedment of the digital watermark information into a Word text via the menu items as an example.

Figure 3:
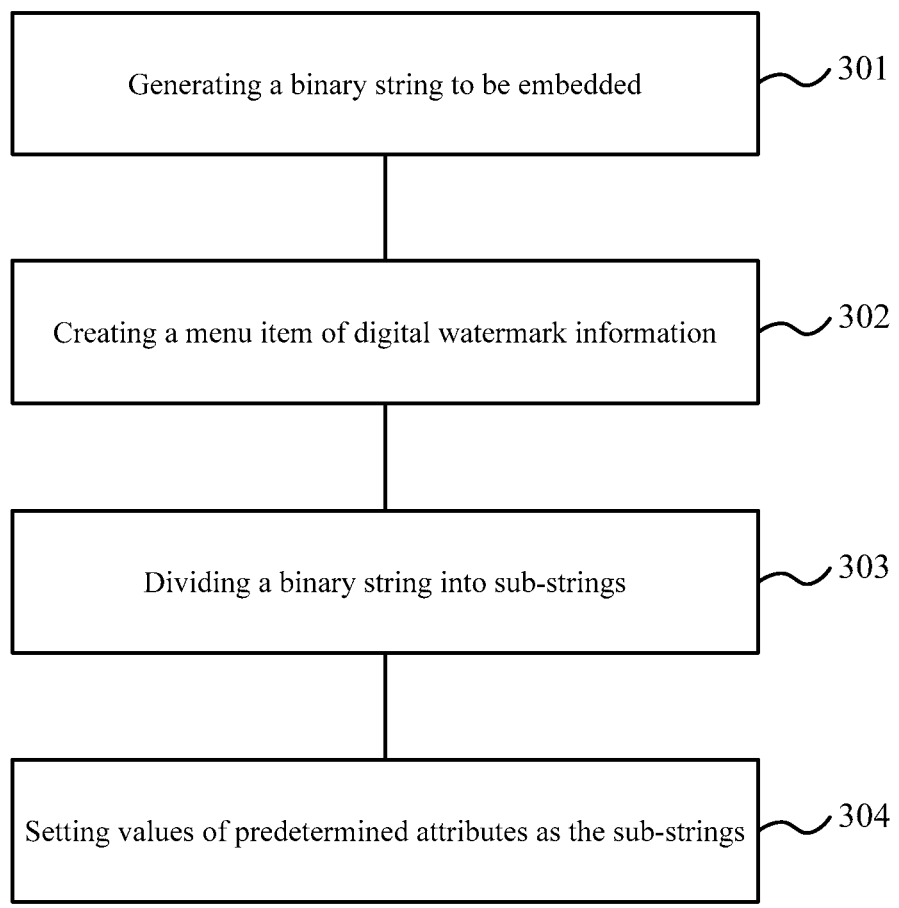
FIG. 3 is a flow chart of a method for embedding digital watermark information into a text according to the first embodiment of the present invention.

FIG. 3 is a flow chart of a method for embedding digital watermark information into a text according to the first embodiment of the present invention. The method comprises the following steps.

Step 301: generating a binary string to be embedded according to predetermined original information.

To be specific, Step 301 includes generating a basic binary string according to the predetermined original information, generating a check string through a predetermined algorithm according to the basic binary string, and generating the binary string to be embedded according to the basic binary string and the check string. The digital watermark information to be embedded is just the generated binary string. The original information may be any predetermined contents.

In this embodiment, the predetermined original information may include a computer name, a name of a currently logged-in user, an IP address, or a current time. The original information is converted into a binary string as the basic binary string, and the check string is generated through a CRC (Cyclic Redundancy Check) algorithm according to the basic binary string. Then, the check string is attached at the end of the basic binary string to generate the binary string to be embedded.

Alternatively, the check string may be generated through other check algorithms, and the generated check string may also be attached at the front or in the middle of the basic binary string.

Preferably, the binary string with a fixed length may be generated. For example, a basic binary string with a length of 512 bits may be generated, and if the basic binary string generated according to the predetermined original information is of a length less than 512 bits, it may be zero-padded. Then, a 16-bit check string is generated through a CRC-16 algorithm, thereby the binary string with a fixed length of 528 bits may be generated.

Further, the generated binary string may be encrypted, and the encrypted binary string may be used as the final binary string to be embedded.

Step 302: creating and marking a menu item of the digital watermark information.

Step 303: dividing the binary string into several sub-strings, each of which has a length not greater than a maximum length of a value of a predetermined attribute for the menu item of the digital watermark information.

In this embodiment, the generated binary string has a length of 528 bits. When the attributes Caption, DescriptionText, HelpFile, Parameter and Tag of the menu item are used as the predetermined attributes and the maximum length of the attribute value is 255 bits, the binary string to be embedded may be divided into three sub-strings with a length of 255 bits, 255 bits and 18 bits respectively.

Step 304: setting the values of the predetermined attributes for the digital watermark information as the sub-strings respectively.

In this embodiment, the values of Caption, DescriptionText and HelpFile for a submenu item of the menu items of the digital watermark information may be sequentially set as the sub-strings.

Through the method according to this embodiment, the digital watermark information is embedded by adding the menu items, so it is able to increase the amount of the digital watermark information to be embedded, and to embed the digital watermark information many times.

Second Embodiment

Figure 4:
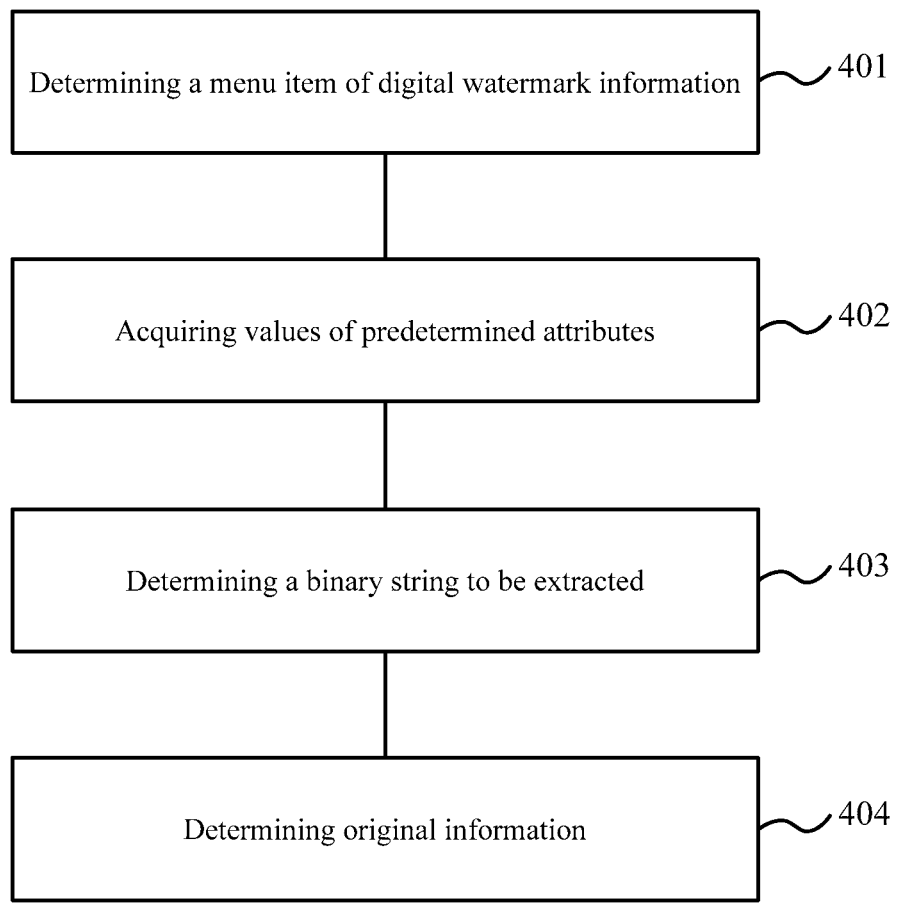
FIG. 4 is a flow chart of a method for extracting digital watermark information from a text according to the second embodiment of the present invention.

With respect to the method for embedding the digital watermark information into the text according to the first embodiment, the embodiment of the present invention further provides a method for extracting digital watermark information from a text. As shown in FIG. 4, the extracting method comprises the following steps.

Step 401: traversing custom menu items to determine a menu item of the digital watermark information.

To be specific, the menu item of the digital watermark information may be determined according to mark information about the menu item of the digital watermark information in Step 302 of the first embodiment.

Step 402: acquiring values of predetermined attributes for the menu item of the digital watermark information.

This step corresponds to Step 304 of the first embodiment, and the order of acquiring the values of the attributes shall be consistent with that of setting the values of the attributes.

Step 403: determining a binary string consisting of the acquired values as the binary string to be extracted, the binary string to be extracted being just the digital watermark information to be extracted.

This step corresponds to Step 303 of the first embodiment, and the acquired values are just the sub-strings divided in Step 303.

Step 404: determining original information corresponding to the extracted binary string.

Corresponding to the generation of the binary string to be embedded in Step 301, this step specifically comprises:

determining a basic binary string and a check string according to the extracted binary string, generating a check string through a predetermined algorithm according to the basic binary string, and when the check string determined according to the extracted binary string is identical to the check string generated according to the basic binary string, determining that the extracted binary string is valid and determining the original information corresponding to the basic binary string.

When the check string determined according to the extracted binary string is different from the check string generated according to the basic binary string, it means the extracted binary string is invalid, and at this time, it is unable to determine the original information corresponding to the extracted binary string.

If the extracted binary string is encrypted, it is required to decrypt the binary string and then perform the subsequent operation of determining the original information.

Through the method according the second embodiment, it is able to extract the digital watermark information embedded according the method of the first embodiment.

Third Embodiment

Due to limited sensitivity of human eyes to colors, it is unable to observe a slight change in a color-associated attribute value for a character in the text content. Hence, the character in the text content may be used as an information carrier, and specified bits in the color-associated attribute value for the carrier information character in the content text may be replaced so as to embed the digital watermark information.

The sensitivities of cone cells of human eyes to the three primary colors, i.e., red, green and blue, are different from each other. To be specific, the human eyes are most sensitive to green, then red and then blue.

In this embodiment, with respect to each color-associated attribute value for the information carrier information in the text content, one least significant bit in the green and red components and two least significant bits in the blue component may be replaced. Alternatively, the other bits in the respective color component may also be replaced.

In the text, the color-associated attributes for the information carrier character include color of the character, underline color of the character, and border color of the character. The 4-bit digital watermark information may be embedded into each attribute value, i.e., the 12-bit digital watermark information may be embedded into each information carrier character.

Figure 5:
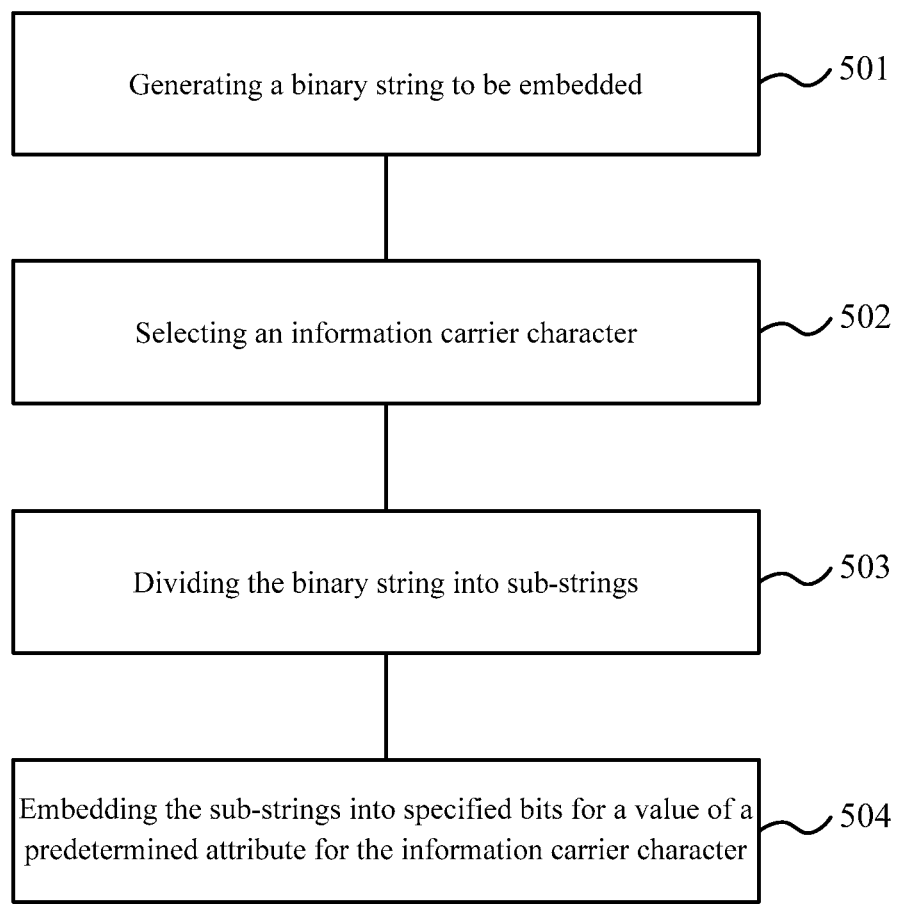
FIG. 5 is a flow chart of a method for embedding digital watermark information into a text according to the third embodiment of the present invention.

FIG. 5 is a flow chart of a method for embedding digital watermark information into a text according to the third embodiment of the present invention. The method comprises the following steps.

Step 501: generating a binary string to be embedded according to predetermined original information.

The binary string to be embedded is just the digital watermark information to be embedded. Referring to Step 301 in the first embodiment, the binary string generated in this embodiment has a length of 528 bits.

Step 502: selecting an information carrier character from the text content.

In this embodiment, because the generated binary string has a length of 528 bits and the 12-bit information may be embedded into each information carrier character, it requires 44 information carrier characters to embed the binary string.

A piece of content containing at least 44 characters may be selected from the text content to serve as the information carrier characters, and a beginning position of the information carrier characters may be marked.

For example, in Word, a value of NoProofing (the spelling and grammar checker ignore) for a first character of the selected information carrier characters may be set as −1. Because an initial value of NoProofing for the characters in a Word text is 0 and can merely be modified programmatically, this attribute may be used to mark a beginning position of the information carrier characters. The other similar attributes, such as DisableCharacterSpaceGrid (the number of characters per line ignores) and a non-printable character, may also be used to mark the beginning position of the information carrier characters.

Step 503: dividing the binary string to be embedded into several sub-strings with a predetermined length.

The predetermined length indicates the length of the digital watermark information capable of being embedded into each information carrier character.

In this embodiment, the predetermined length is 12 bits, and the binary string to be embedded is divided into 44 sub-strings with a length of 12 bits.

Step 504: embedding the sub-strings into specified bits of the color-associated attribute values for the information carrier characters.

In other words, with respect to an information carrier character, the specified bits of the color-associated attribute value in the information carrier character are replaced with the bits of the sub-string. The color-associated attributes include color of the character, underline color of the character and border color of the character. In this embodiment, the specified bits include one least significant bit in the green and red components, and two least significant bits in the blue component.

Through the method according to the third embodiment, the color of the character, the underline color and the border color in the text content are slightly changed so as to embed the digital watermark information. As compared with the prior art, the amount of the digital watermark information to be embedded may be increased according to the method of the embodiment. In order to enhance the robustness of the digital watermark information, several pieces of text content may also be selected for redundant embedment.

Fourth Embodiment

Figure 6:
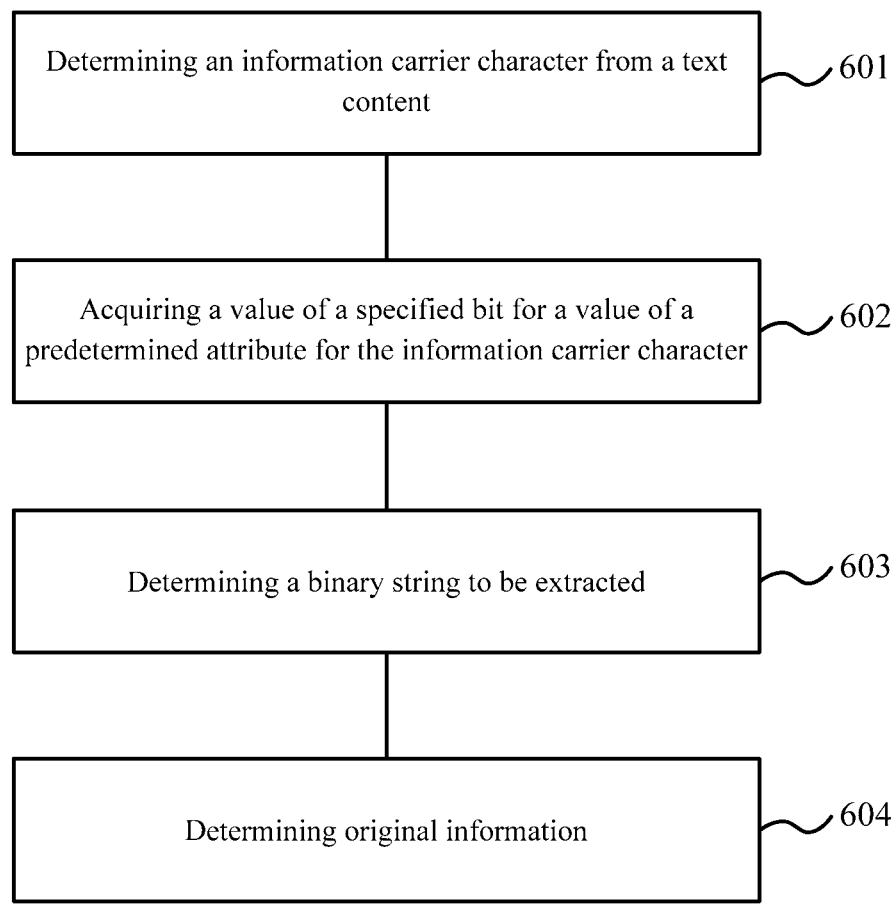
FIG. 6 is a flow chart of a method for extracting digital watermark information from a text according to the fourth embodiment of the present invention.

With respect to the method for embedding the digital watermark information into the text according to the third embodiment, the embodiment of the present invention further provides a method for extracting digital watermark information from a text. As shown in FIG. 6, the method comprises the following steps.

Step 601: determining an information carrier character from a text content.

To be specific, the information carrier character may be determined according to the mark information about the information carrier information in Step 502 of the third embodiment.

Step 602: acquiring a value for a specified bit of a value of a predetermined attribute for each information carrier character, to form a sub-string.

This step corresponds to Step 504 of the third embodiment, and the order of acquiring the values is consistent with that of embedding the values.

Step 603: determining a binary string consisting of several sub-strings as a binary string to be extracted, the binary string to be extracted being the digital watermark information to be extracted. This step corresponds to Step 503 of the third embodiment.

Step 604: determining original information corresponding to the extracted binary string (referring to Step 404 of the second embodiment).

Through the method according to the fourth embodiment, it is able to extract the digital watermark information embedded according to the method of the third embodiment.

Preferably, redundant embedment of the digital watermark information into the text may also be performed using the methods according to the first and third embodiments.

Fifth Embodiment

Figure 7:
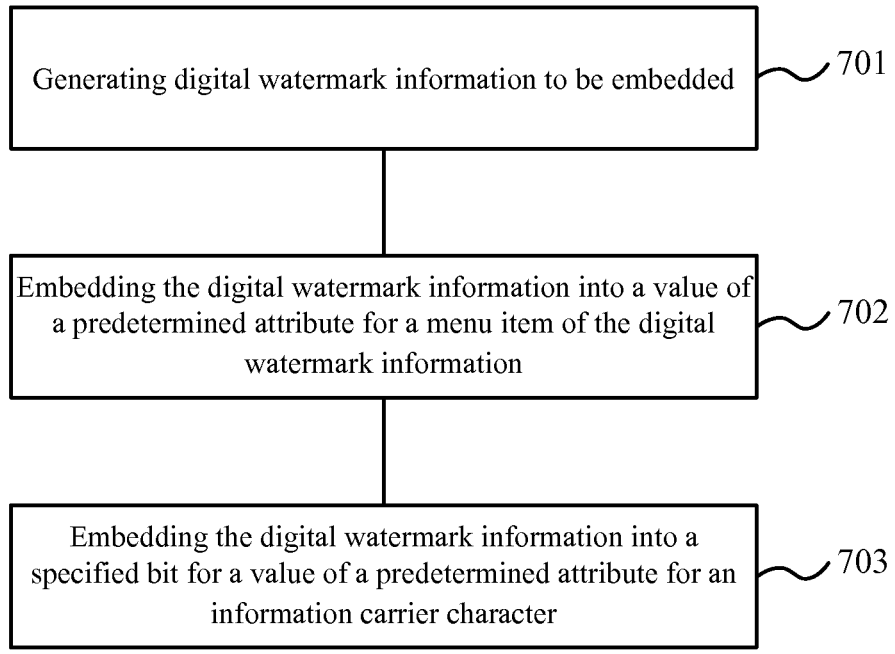
FIG. 7 is a flow chart of a method for embedding digital watermark information into a text according to the fifth embodiment of the present invention.

FIG. 7 is a flow chart of a method for embedding digital watermark information into a text according to the fifth embodiment of the present invention. The method comprises the following steps.

Step 701: generating the digital watermark information to be embedded according to predetermined original information. The digital watermark information is a binary string (referring to Step 301 of the first embodiment).

Step 702: embedding the digital watermark information into a value of a predetermined attribute for a created menu item of the digital watermark information (referring to Steps 302-304 of the first embodiment).

Step 703: embedding the digital watermark information into a specified bit for a value of a predetermined attribute for a selected information carrier character in the text content (referring to Steps 502-504 of the third embodiment). The predetermined attributes for the information carrier character include color of the character, underline color of the character and border color of the character.

Steps 702 and 703 may be executed in no particular order. Alternatively, Step 703 may be executed prior to Step 702, or the two steps may be executed simultaneously.

Sixth Embodiment

Figure 8:
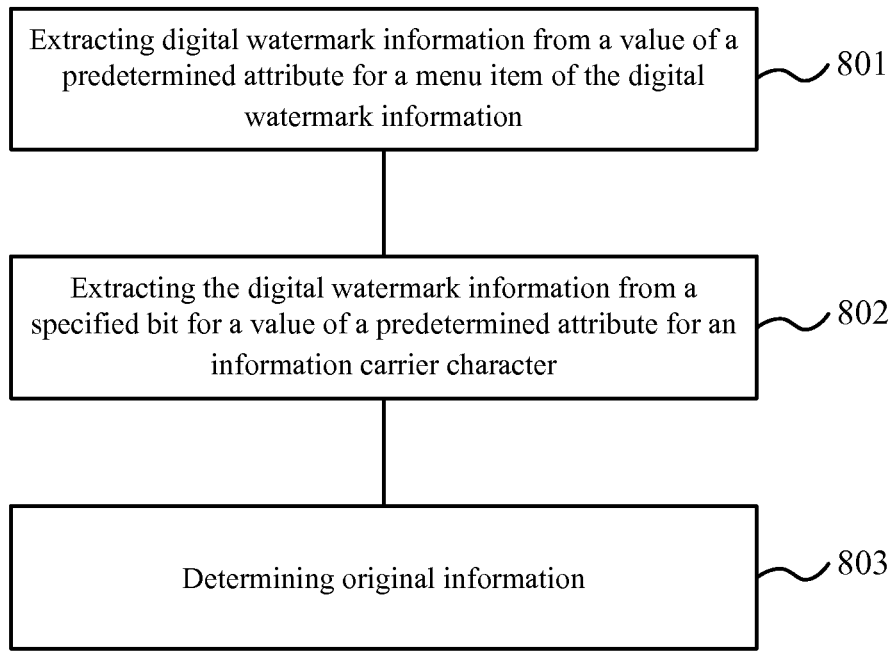
FIG. 8 is a flow chart of a method for extracting digital watermark information from a text according to the sixth embodiment of the present invention.

With respect to the method for embedding the digital watermark information into the text according to the fifth embodiment, the embodiment of the present invention further provides a method for extracting digital watermark information from a text. As shown in FIG. 8, the method comprises the following steps.

Step 801: extracting the digital watermark information from a value of a predetermined attribute for a determined menu item of the digital watermark information (referring to Steps 401-403 of the second embodiment).

Step 802: extracting the digital watermark information from a specified bit for a value of a predetermined attribute for a determined information carrier character (referring to Steps 601-603 of the fourth embodiment). The predetermined attributes for the information carrier character include color of the character, underline color of the character, and border color of the character.

Steps 801 and 802 may be performed in no particular order. Alternatively, Step 802 may be executed prior to Step 801, or these steps may be executed simultaneously.

After the extraction of the digital watermark information, the method further comprises Step 803: determining original information.

When the digital watermark information extracted from the value of the predetermined attribute for the menu item of the digital watermark information is identical to the digital watermark information extracted from the specified bit for the value of the predetermined attribute for the information carrier character, the original information corresponding to the extracted digital watermark information may be determined. The original information may be determined according to any valid one of the two pieces of the extracted digital watermark information.

When the digital watermark information extracted from the value of the predetermined attribute for the menu item of the digital watermark information is different from the digital watermark information extracted from the specified bit for the value of the predetermined attribute for the information carrier character, the method may include judging whether or not the two pieces of the extracted digital watermark information are valid. If one piece of the extracted digital watermark information is valid and the other is invalid, the original information may be determined according to the valid digital watermark information. If the two pieces of the extracted digital watermark information are valid or invalid, it is unable to determine the original information according to these two pieces of the extracted digital watermark information.

Referring to Step 404 of the second embodiment, the digital watermark information extracted in this step corresponds to the binary string extracted in Step 404.

It can therefore be seen that, when the method according to the fifth embodiment is used for the redundant embedment of the digital watermark information, the two pieces of digital watermark information may be verified and compared after these two pieces of digital watermark information are extracted according to the method of the sixth embodiment. As a result, it is able to improve the accuracy of the extracted digital watermark information.

Seventh Embodiment

Figure 9:
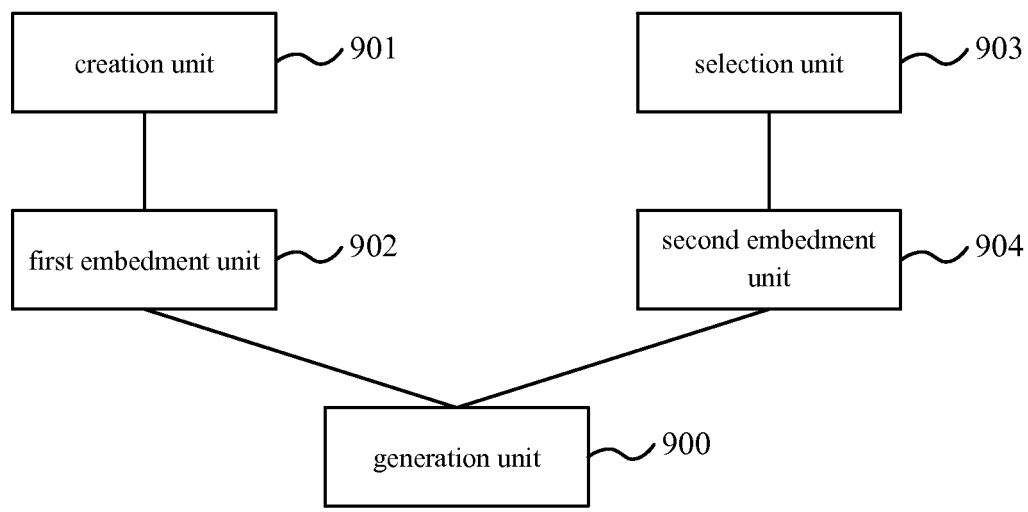
FIG. 9 is a schematic view showing an apparatus for embedding digital watermark information into a text according to the seventh embodiment of the present invention.

Corresponding to the methods for embedding digital watermark information into a text as mentioned above, this embodiment of the present invention further provides an apparatus for embedding digital watermark information into a text. As shown in FIG. 9, the apparatus comprises:

a creation unit 901 configured to create a menu item of the digital watermark information; and a first embedment unit 902 configured to embed a binary string into a value of a predetermined attribute for the menu item of the digital watermark information, the binary string to be embedded being the digital watermark information to be embedded.

Further, the first embedment unit 902 is specifically configured to, when the binary string to be embedded has a length greater than a predetermined length, divide the binary string into several sub-strings, each of which has a length not greater than the predetermined length, and set the values of the predetermined attributes for the menu item of the digital watermark information as the sub-strings with a length not greater than the predetermined length respectively. The predetermined length is a maximum length of the value of the predetermined attribute for the menu item of the digital watermark information.

Further, the first embedment unit 902 is specifically configured to, when the binary string to be embedded has a length not greater than the predetermined length, set a value of a predetermined attribute for the menu item of the digital watermark information as the binary string to be embedded. The predetermined length is a maximum length of the value of the predetermined attribute for the menu item of the digital watermark information.

The apparatus further comprises:

a selection unit 903 configured to select an information carrier character from a text content; and a second embedment unit 904 configured to embed the binary string into a specified bit for a value of a predetermined attribute for the information carrier character, wherein the predetermined attribute of the information carrier character includes color of the character, underline color of the character and border color of the character.

The apparatus further comprises:

a generation unit 900 configured to generate a basic binary string according to predetermined original information, generate a check string through a predetermined algorithm according to the basic binary string, and generate the binary string to be embedded according to the basic binary string and the check string.

Eighth Embodiment

Figure 10:
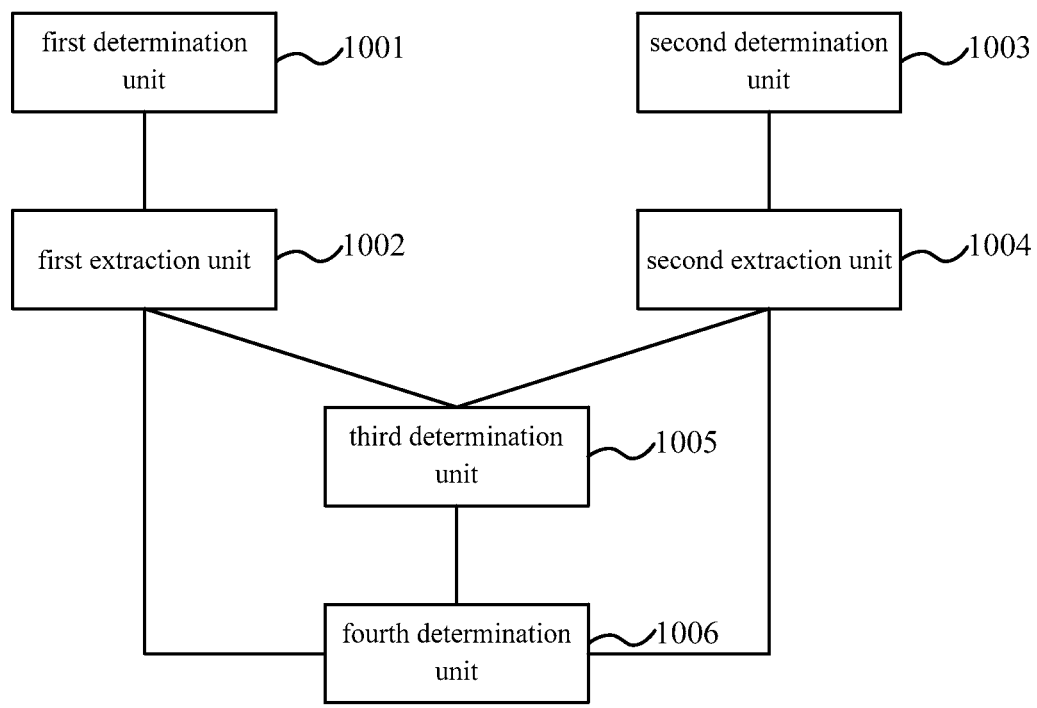
FIG. 10 is a schematic view showing an apparatus for extracting digital watermark information from a text according to the eighth embodiment of the present invention.

With respect to the methods for extracting digital watermark information from a text as mentioned above, this embodiment of the present invention further provides an apparatus for extracting digital watermark information from a text. As shown in FIG. 10, the apparatus comprises:

a first determination unit 1001 configured to determine a menu item of the digital watermark information; and a first extraction unit 1002 configured to extract a binary string from a value of a predetermined attribute for the menu item of the digital watermark information, the binary string to be extracted being the digital watermark information to be extracted.

Further, the first extraction unit 1002 is specifically configured to acquire values of predetermined attributes for the menu item of the digital watermark information, and determine a binary string consisting of the acquired values as the binary string to be extracted.

Further, the first extraction unit 1002 is specifically configured to acquire a value of a predetermined attribute for the menu item of the digital watermark information, and determine the acquired value as the binary string to be extracted.

The apparatus further comprises:

a second determination unit 1003 configured to determine an information carrier character from the text content; and a second extraction unit 1004 configured to extract a binary string to be extracted from a specified bit for a value of a predetermined attribute for the information carrier character, wherein the predetermined attribute for the information carrier character includes color of the character, underline color of the character and border color of the character.

The apparatus further comprises:

a third determination unit 1005 configured to determine whether or not the binary string extracted from the value of the predetermined attribute for the menu item of the digital watermark information is identical to the binary string extracted from the specified bit for the value of the predetermined attribute for the information carrier character.

The apparatus further comprises:

a fourth determination unit 1006 configured to determine a basic binary string and a check string according to the extracted binary string, generate a check string through a predetermined algorithm according to the basic binary string, and when the check string determined according to the extracted binary string is identical to the check string generated according to the basic binary string, determine original information corresponding to the basic binary string.

The functions of the above-mentioned units may correspond to the steps as shown in any one of FIGS. 1-8, and they will not be repeated herein.

In a word, the solutions of the embodiments of the present invention include the steps of creating the menu item of the digital watermark information, and embedding the binary string to be embedded into the value of the predetermined attribute for the menu item of the digital watermark information. The binary string to be embedded is just the digital watermark information to be embedded. According to the embodiments of the present invention, it is able to increase the amount of the embedded digital watermark information.

The apparatuses for embedding and extracting the digital watermark information according to the embodiments of the present invention may be implemented via computer program. It should be appreciated that, the above-mentioned modes for dividing the units are merely for illustrative purposes, and the apparatuses may include the other units or may not include any units, as long as the apparatuses have the above-mentioned functions. These apparatuses shall also be included in the scope of the present invention.

The present invention is described with reference to the flow charts and/or block diagrams showing the method, device (system) and computer program product according to the embodiments of the present invention. It should be appreciated that each process and/or block, or combinations thereof, in the flow charts and/or block diagrams may be implemented via computer program commands. These computer program commands may be applied to a general-purpose computer, a special-purpose computer, an embedded processor or any other processor of programmable data processing equipment, so as to form a machine, thereby to obtain the means capable of effecting the functions specified in one or more processes in the flow charts and/or one or more blocks in the block diagrams in accordance with the commands executed by the computer or the processor of the other programmable data processing equipment.

These computer program commands may also be stored in a computer-readable memory capable of guiding the computer or the other programmable data processing equipment to work in a special manner, so as to form a product including a command device capable of effecting the functions specified in one or more processes in the flow charts and/or one or more blocks in the block diagrams.

These computer program commands may also be loaded onto a computer or the other programmable data processing equipment, so as to perform a series of operations thereon and generate the processings implemented by the computer, thereby to provide the steps capable of effecting the functions specified one or more processes in the flow charts and/or one or more blocks in the block diagrams in accordance with the instructions.

Obviously, a person skilled in the art may make various modifications and alterations without departing from the spirit and scope of the present invention. the present invention is also intended to include these modifications and alterations if they fall within the scope of the attached claims and the equivalents thereof.

What is claimed is:

1. a method for embedding digital watermark information into a text file by using a text processing device, the method comprising:

creating, for the text file, a menu item for the digital watermark information, wherein the menu item comprises a plurality of attribute and types of values of the attributes are binary strings: and embedding a binary string into a value of a predetermined attribute of the menu item, the binary string to be embedded being the digital watermark information to be embedded;

wherein the text processing device is capable of programmatically customizing menu items of the text file and is capable of hiding the menu items for the text life.

2. The method according to claim 1, wherein the step of embedding a binary string into a value of a predetermined attribute of the menu item comprises:

when the binary string to be embedded has a length greater than a predetermined length, dividing the binary string into several sub-strings, each of which has a length not greater than the predetermined length, the predetermined length being a maximum length of the value of the predetermined attribute of the menu item; and setting the values of the predetermined attributes of the menu item as the sub-strings with a length not greater than the predetermined length respectively.

3. The method according to claim 1, wherein the step of embedding a binary string into a value of a predetermined attribute of the menu item comprises:

when the binary string to be embedded has a length not greater than a predetermined length, setting a value of a predetermined attribute of the menu item as the binary string to be embedded, the predetermined length being a maximum length of the value of the predetermined attribute of the menu item.

4. The method according to claim 1, further comprising:

selecting an information carrier character from a text content; and embedding the binary string into a specified bit of a value of a predetermined attribute of the information carrier character, wherein the predetermined value for the information carrier character includes color of the character, underline color of the character and border color of the character.

5. The method according to claim 1, wherein the binary string to be embedded is generated by:

generating a basic binary string according to predetermined original information;

generating a check string through a predetermined algorithm according to the basic binary string; and generating the binary string to be embedded according to the basic binary string and the check string.

6. A method for extracting digital watermark information embedded through the method according to claim 1, comprising the steps of:

determining a menu item; and extracting a binary string from a value of a predetermined attribute of the menu item, the binary string to be extracted being the digital watermark information to be extracted.

7. The method according to claim 6, wherein the step of extracting a binary string from a value of a predetermined attribute of the menu item comprises:

acquiring values of predetermined attributes of the menu item; and determining the binary string to be extracted as an acquired binary string consisting of the acquired values.

8. The method according to claim 6, wherein the step of extracting a binary string from a value of a predetermined attribute of the menu item comprises:

acquiring a value of a predetermined attribute of the menu item; and determining the binary string to be extracted as the acquired value.

9. The method according to claim 6, further comprising:

determining an information carrier character in the text content; and extracting the binary string from a specified bit of a value of a predetermined attribute of the information carrier character, wherein the predetermined value for the information carrier character includes color of the character, underline color of the character and border color of the character.

10. The method according to claim 9, further comprising:

determining whether or not the binary string extracted from the value of the predetermined attribute of the menu item is identical to the binary string extracted from the specified bit for the value of the predetermined attribute of the information carrier character.

11. The method according to claim 6, further comprises:

determining a basic binary string and a check string according to the extracted binary string;

generating a check string through a predetermined algorithm according to the basic binary string; and when the check string determined according to the extracted binary string is identical to the check string generated according to the basic binary string, determining original information corresponding to the basic binary string.

12. an apparatus for embedding digital watermark information into a text file, comprising:

a processor comprising;

a creation unit for creating, for the text file, a menu item for the digital watermark information, wherein the menu item comprises a plurality of attributes and types of values of the attributes are binary strings: and a first embedment unit for embedding a binary string into a value of a predetermined attribute of the menu item, the binary string to be embedded being the digital watermark information to be embedded.

wherein the processor is capable of programmatically customizing menu items of the text file and is capable of hiding the menu items for the text file.

13. The apparatus according to claim 12, wherein the first embedment unit, when the binary string to be embedded has a length greater than a predetermined length, divides the binary string into several sub-strings, each of which has a length not greater than the predetermined length, and sets the values of the predetermined attributes of the menu item as the sub-strings with a length not greater than the predetermined length respectively, wherein the predetermined length is a maximum length of the value of the predetermined attribute of the menu item.

14. The apparatus according to claim 12, wherein the first embedment unit, when the binary string to be embedded has a length not greater than the predetermined length, sets a value of a predetermined attribute of the menu item as the binary string to be embedded, wherein the predetermined length is a maximum length of the value of the predetermined attribute of the menu item.

15. The apparatus according to claim 12, the processor further comprising:

a selection unit for selecting an information carrier character from a text content; and a second embedment unit for embedding the binary string into a specified bit for a value of a predetermined attribute of the information carrier character, wherein the predetermined attribute of the information carrier character includes color of the character, underline color of the character and border color of the character.

16. The apparatus according to claim 12, the processor further comprising:

a generation unit for generating a basic binary string according to predetermined original information, for generating a check string through a predetermined algorithm according to the basic binary string, and for generating the binary string to be embedded according to the basic binary string and the check string.

17. An apparatus for extracting the digital watermark information embedded by the apparatus according to claim 12, comprising:

a processor comprising:

a first determination unit for determining a menu item of the digital watermark information; and a first extraction unit for extracting a binary string from a value of a predetermined attribute of the menu item, the binary string to be extracted being the digital watermark information to be extracted.

18. The apparatus according to claim 17, wherein the first extraction unit acquires values of predetermined attributes of the menu item, and determines a binary string consisting of the acquired values as the binary string to be extracted.

19. The apparatus according to claim 17, wherein the first extraction unit acquires a value of a predetermined attribute of the menu item, and determines the acquired value as the binary string to be extracted.

20. The apparatus according to claim 17, the processor further comprising:

a second determination unit for determining an information carrier character from the text content; and a second extraction unit for extracting a binary string to be extracted from a specified bit for a value of a predetermined attribute of the information carrier character, wherein the predetermined attribute of the information carrier character includes color of the character, underline color of the character, and border color of the character.

21. The apparatus according to claim 20, the processor further comprising:

a third determination unit for determining whether or not the binary string extracted from the value of the predetermined attribute of the menu item is identical to the binary string extracted from the specified bit for the value of the predetermined attribute of the information carrier character.

22. The apparatus according to claim 17, the processor further comprising:

a fourth determination unit for determining a basic binary string and a check string according to the extracted binary string, generates a check string through a predetermined algorithm according to the basic binary string, and when the check string determined according to the extracted binary string is identical to the check string generated according to the basic binary string, determines original information corresponding to the basic binary string.

* * * * *